United States Patent
Knapp

(10) Patent No.: US 6,263,919 B1
(45) Date of Patent: Jul. 24, 2001

(54) SEQUENTIAL CARTRIDGE FOR A MIXING DEVICE, EXCHANGEABLE FOR THERMOSTATIC CARTRIDGE

(75) Inventor: Alfons Knapp, Biberach/Riss (DE)

(73) Assignee: Masco Corporation of Indiana, Taylor, MI (US)

( * ) Notice: Subject to any disclaimer, the term of this patent is extended or adjusted under 35 U.S.C. 154(b) by 0 days.

(21) Appl. No.: 09/673,866
(22) PCT Filed: May 6, 1999
(86) PCT No.: PCT/US99/09999
§ 371 Date: Oct. 19, 2000
§ 102(e) Date: Oct. 19, 2000
(87) PCT Pub. No.: WO99/56522
PCT Pub. Date: Nov. 11, 1999

(30) Foreign Application Priority Data

May 6, 1998 (IT) .............................................. TO98A0379

(51) Int. Cl.[7] ..................................................... F16K 11/07
(52) U.S. Cl. .................. 137/625.4; 137/269; 137/625.48
(58) Field of Search ............................ 137/625.4, 625.48, 137/269

(56) References Cited

U.S. PATENT DOCUMENTS

| | | |
|---|---|---|
| 5,107,884 | 4/1992 | Orlandi . |
| 5,356,074 | 10/1994 | Limet et al. . |
| 5,580,031 | 12/1996 | Lorch . |

Primary Examiner—John Fox
(74) Attorney, Agent, or Firm—Reising, Ethington, Barnes, Kisselle, Learman & McCulloch, PC

(57) ABSTRACT

A sequential mixing cartridge (10), for use with a cold and hot water mixing device, comprises with entry openings (15, 16) for cold water and hot water and with a delivery opening (18) for mixed water. The interior of the body houses a sequential mixing slide valve (19) as well as operating members (25) for this mechanism partially protruding from the body. The shape and outside dimensions of the body as well as the arrangement of the inlet openings for cold water and hot water and for delivery of mixed water substantially match the construction and dimensions of a thermostatic mixing cartridge, thus achieving complete interchangeability with it. The sequential mixing mechanism (19) is preferably constructed to provide a delivery shut-off control member extension (21) for regulating the flow rate. Preferably, the body has inlet openings (15, 16) for cold water and hot water on its outer surface and the delivery opening (18) for mixed water at its axial end that is axially opposite to the control member (25).

8 Claims, 1 Drawing Sheet

SEQUENTIAL CARTRIDGE FOR A MIXING DEVICE, EXCHANGEABLE FOR THERMOSTATIC CARTRIDGE

TECHNICAL FIELD

This invention relates to a mixing cartridge intended for a cold and hot water mixing valve.

BACKGROUND OF THE INVENTION

Currently, various types of mixing valves are constructed to receive a mixing cartridge of the sequential type. A sequential type of cartridge has a valve designed to ensure in the progressive movement of an operating member in a certain field of adjustment, firstly, the delivery of cold water only, then a mixture with growing volumes of hot water, and finally the delivery of hot water only.

Thermostatic mixing valves are also known, which are constructed to receive a thermostatic mixing cartridge. The thermostatic cartridge is designed to regulate the mixing of cold water and hot water so as to ensure the delivery of mixed water having within a certain field of approximation a constant, possibly adjustable temperature.

Both of the thermostatic valves and sequential mixing valves have been linked in a pipeline for adjustment of flow to separate faucets. Alternatively both valves can be installed serially in a single faucet.

However, known mixing valves constructed to receive a sequential mixing cartridge cannot have the cartridge replaced with a thermostatic mixing cartridge, and mixing valves constructed to receive a thermostatic mixing cartridge, cannot have the cartridge replaced with receive a sequential mixing cartridge. In the current state of the art, these two types of mixing cartridges have different constructions both in terms of external dimensions and placement of inlet openings for cold water and hot water and for delivery of mixed water so that they are incompatible with each other and cannot be interchangeable.

This situation entails inconveniences. As a matter of fact, on the one hand, when it comes to actual manufacturing, it is necessary to provide units of different design and construction for a mixing valve housing intended to receive a sequential mixing cartridge and a mixing valve housing intended to receive a thermostatic mixing cartridge. The two different housing constructions result in an increase in their manufacturing and storage cost and, on the other hand, it is not possible to meet the requirement of a user to switch from a sequential mixing system to a thermostatic mixing system or vice versa without entirely replacing the mixing valve housing.

SUMMARY OF THE INVENTION

In accordance with one aspect of this invention, a cartridge is constructed to selectively accommodate the function of a thermostatic mixing cartridge or the function of a sequential mixing valve cartridge. As a result, a mixing valve housing will be able without modification to receive a selected one of a sequential mixing cartridge and a thermostatic mixing cartridge. As such a mixing device for thermostatic control can be easily connected to a sequential mixing device and vice versa. The replacement of one cartridge with the other is easy, thus providing the possibility of meeting any sudden requirement of a user simply by replacement of the mixing cartridge inserted in the body of the mixing valve housing.

The sequential mixing cartridge, intended for a cold and hot water mixing device, includes a housing or body with inlet openings for cold water and for hot water and with a delivery opening for mixed water and including, in its interior, a sequential mixing mechanism as well as an operating handle for the mechanism partially protruding from the body for manual operation. The shape and outside dimensions of the housing as well as the arrangement of the inlet openings for cold water and hot water and for delivery of mixed water substantially correspond to the pertinent construction and dimensions of a thermostatic mixing cartridge.

The sequential mixing cartridge according to the invention can be mounted in a mixing valve housing device constructed to receive the thermostatic mixing cartridge, and reciprocally, the thermostatic mixing cartridge can be mounted in a mixing valve housing constructed to receive a sequential mixing cartridge according to the invention.

Preferably, furthermore, the sequential mixing mechanism is also constructed to provide a delivery intercept or shut-off position and a regulating field for the delivered water volume. The cartridge may comprise a control member for the slide valve that extends up to a point in proximity to the delivery opening and cooperates with it in order partially or completely close it thereby providing a water flow volume and shut off function. In this way, the cartridge for the sequential mixing, according to the invention can confer upon the mixing device in which is mounted also the shut-off feature of a mixing faucet. One can expand the design and storage combination allowed by the cartridge, according to the invention, also permitting a standardization between mixing devices that have or do not have the shut off character of a mixing faucet.

Preferably, the cartridge housing has inlet openings for cold water and for hot water arranged on its shell surface and the delivery opening for mixed water is arranged in accordance with its end that is axially opposite to the extending operating members.

In this case, the sequential mixing action is performed by a slide valve that is axially mobile due to the action of a control member and that cooperates directly or indirectly with the entry openings in a manner similar to what happens in a thermostatic mixing cartridge. This also facilitates a certain standardization of the internal components of the sequential mixing cartridge according to the invention with respect to the corresponding components of a thermostatic mixing cartridge, and this facilitates further savings in cartridge manufacturing costs.

The slide valve control member can advantageously be operated by an operating member screwed into the valve housing of the cartridge and intended to be operated in a rotating manner.

BRIEF DESCRIPTION OF THE DRAWINGS

Reference now is made to the accompanying drawings, in which.

DETAILED DESCRIPTION OF THE PREFERRED EMBODIMENT

Figures 1, 2:
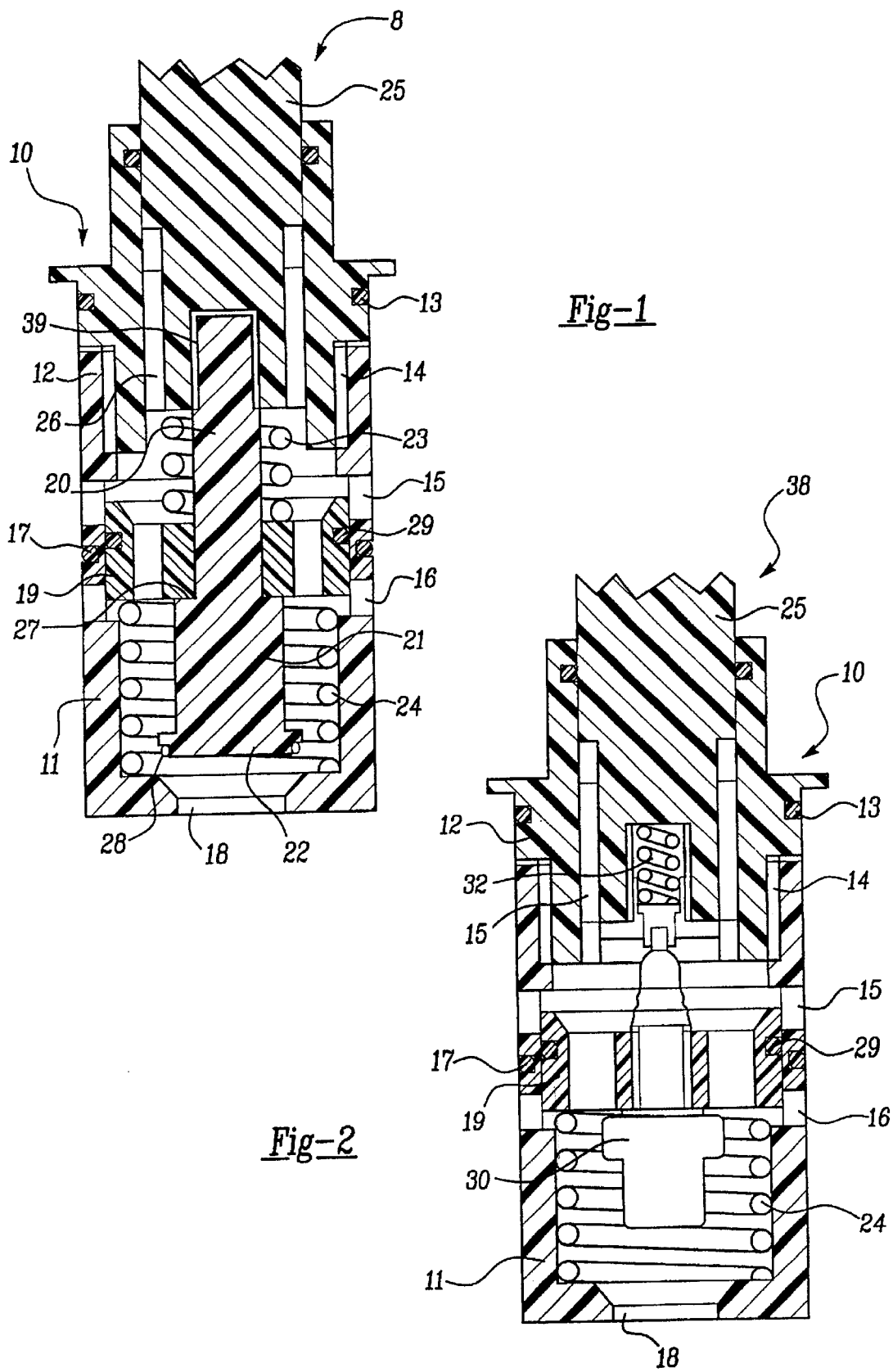
FIG. 1 illustrates an embodiment of the sequential mixing valve housing and sequential mixing cartridge according to the invention in an axial profile.
FIG. 2 analogously illustrates an embodiment of the thermostatic mixing cartridge and housing within which the cartridge according to FIG. 1 is interchangeable.

Referring now to FIG. 1, a sequential mixing cartridge 8 according to the invention comprises an outer housing 10 made up of two parts, a lower part or body 11 and an upper part or cap 12. The upper part 12 acts as a cap for the body and is provided with a ring-shaped packing washer 13 to provide a hold in the body of a mixing device (not shown) in which the cartridge is intended to be introduced. In the form shown, the two parts 11 and 12 of the outer housing are reciprocally linked by means of a threaded coupling 14, but they can also be linked in any other way so that they can or cannot be disassembled. The lower body 11 has axially spaced openings 15 and 16 for the entry of respective cold and hot water. The openings 15 and 16 are separated by a ring-shaped exterior packing 17. Other packings can be provided but are not shown. As an alternative 14, the packing can be carried by the body of the mixing device that is intended to receive the cartridge 10. At its inside end, lower body 11 of the cartridge housing 10 has a delivery opening 18 for mixed water.

Comparing FIG. 1, which shows a sequential mixing cartridge 8 according to the invention, with FIG. 2, which shows a thermostatic mixing cartridge 38 according to standard technique, one can easily find that the shapes and outside dimensions of housing 10 and the placement of inlet openings 15 and 16 and delivery opening 18 of the sequential mixing cartridge 8 according to the invention are identical to the corresponding shapes and arrangements of the corresponding parts 11 and 12 of corresponding housing 10 of a thermostatic mixing cartridge 38. These parts are labeled with the same numerical references. It is therefore clear that the sequential mixing cartridge 8 according to FIG. 1 is entirely interchangeable with the thermostatic mixing cartridge 38 according to FIG. 2.

Inlet openings 15 and 16 for cold water and hot water of the sequential mixing cartridge are controlled by a slide valve 19 that is axially mobile and identical to the corresponding slide valve 19 of the thermostatic mixing cartridge in FIG. 2. Slide valve 19 in FIG. 1 is axially slideable to and operated by a control member 20 that has a lower part 21 forming an abutment shoulder 27 against which slide valve 19 is pushed by a spring 23. A spring 24, weaker than spring 23, biases slide valve 19 upward. We can then see that normally the slide valve 29 follows the axial shifting of control member 20. It is shown in an intermediate position, but one can understand that starting from its lowest position in which it fully opens the inlet openings 15 for cold water and completely closes the inlet openings 16 for hot water and shifting upward (according to the figure) due to both the biasing action of spring 24 and the lifting by shoulder 21, slide valve 19 progressively uncovers inlet openings 16 for hot water and progressively blocks inlet openings 15 for cold water, thus leading to the delivery of mixed water at a progressively rising temperature up to the point where it completely closes inlet openings 15 for cold water and fully opens openings 16 and hence gives rise to the delivery of hot water only. A sealing gasket 29 installed on the slide valve prevents cross flow leakage.

Control member 20 may have a threaded connection 39 with an operating member or stem 25 that allows control member 20 to move with operating member 25. Operating member 25, in the manner shown, is in turn coupled to the upper part 12 of the envelope of the cartridge by means of a working threading 26 so that when it is manually rotated, it axially moves up and down to axially move the control member 20 and slide valve 19 up and down. The operating member 25 is connectable to a handle (not shown).

In the embodiment shown, lower part 21 of control member 20 extends to a point in proximity to delivery opening 18. Its distal end is a head 22 provided with sealing gasket 28 that can be seated at opening 18. Control 15 member 10, therefore, is able partially or totally to block delivery opening 18, thus acting as a faucet for adjusting the flow rate and for intercept or complete shut-off of water flow. The approach of head 12 of control member 10 to delivery opening 18 in order partially or totally to block it is made possible by the fact that while slide valve 19 is slideably mounted on lower part 21 and biased by spring 23. When the slide valve 19, reaches the end of its run downward to block off ports 16 of control member 20 can move further down separation shoulder 27 from slide valve 19 and leaving slide valve 19 motionless and compressing spring 23.

However, this function of adjusting the flow volume and of shutoff function is not always required. When it is not necessary to provide flow volume control shut-off, lower part 21 of control member 20 can end just below slide valve 19 and shoulder 27 so that there will be no head 22 and no sealing packing 28. In this case, other simplifications can also be introduced in the structure.

As shown by a comparison of FIGS. 1 and 2, different internal components of the sequential mixing cartridge and the thermostatic mixing cartridge can also be standardized (common to both cartridges) thus reducing manufacturing costs. The slide valve 19, slide seal 29, operation member 25, and lower spring 24 are all common interior components. The characteristic components namely the thermostatic element 30 and the safety spring 32 of the thermostatic mixing cartridge in FIG. 2 are not further described because they have conventional structure and function and because they are not related to this invention.

It must be understood, of course, that the invention is not confined to the embodiment described and illustrated as example. Some possible modifications have been described and others are within reach of the expert in the field; in particular, the shapes and outside dimensions of the envelope of the sequential mixing cartridge and the arrangement of the inlet and delivery openings must be modified when one wishes to make the sequential mixing cartridge interchangeable with various models of thermostatic mixing cartridges.

These and other modifications and any substitution with technical equivalents can be introduced in what is described and illustrated here without deviating from the scope of the invention and the coverage of this patent.

I claim:

1. A sequential mixing cartridge for a cold and hot water mixing device, comprising an outer body with entry openings for cold water and hot water and with a delivery opening for mixed water and housing a sequential mixing mechanism and operating member partially protruding from the body, characterized by the shape and outside dimensions of said outer body as well as the arrangement of the inlet openings for cold water and hot water and for delivery of mixed water substantially match the pertinent features of a thermostatic mixing cartridge.

2. A sequential mixing cartridge according to claim 1, further characterized by a delivery shut-off member for the adjustment of the delivered flow rate.

3. A sequential mixing cartridge according to claim 1, further characterized by:

said body has inlet openings for cold water and for hot water arranged on its outer surface and that the mixed water delivery opening is at its axial end, axially opposite to said operating member.

4. A sequential mixing cartridge according to claim 3, above, further characterized by:

the sequential mixing action is performed by a slide valve that is axially mobile due to the action of said operating member and that cooperates directly or indirectly with said inlet openings.

5. A sequential mixing cartridge according to claim 4, further characterized by:

a control member connected to the slide valve extending to a point in proximity to the delivery opening and cooperates with it in order partially or completely to block it and hence to control the flow rate through said cartridge.

6. A sequential mixing cartridge according to claim 4, further characterized by:

the slide valve member is operated by the operating member screwed into the body of the cartridge and intended to be operated in a rotary fashion.

7. An interchangeable sequential mixing valve cartridge and thermostatic valve cartridge kit characterized by:

a common outer body including a common lower body and common cap member; said body having hot and cold inlets about a side wall of said outer body and a mixed water outlet at an axial end;

a common slide valve slideably mounted in the interior of said lower body;

a common lower spring biasing said slide valve toward said cap end;

a common operating member operably mountable through said cap and operably connected to said slide valve;

a control member to be selectively interposed between said operating member and said slide valve;

a thermostatic assembly to be selectively interposed between said operating member and said slide valve.

8. An interchangeable sequential mixing valve cartridge and thermostatic valve cartridge kit as defined in claim 7 further characterized by:

a control member connected to the slide valve extending to a point in proximity to the delivery opening and cooperates with it in order partially or completely to block it and hence to control the flow rate through said cartridge.

* * * * *